Apr. 10, 1923.
A. H. NELLER
1,451,402
ANIMAL STANCHION
Filed Jan. 19, 1922
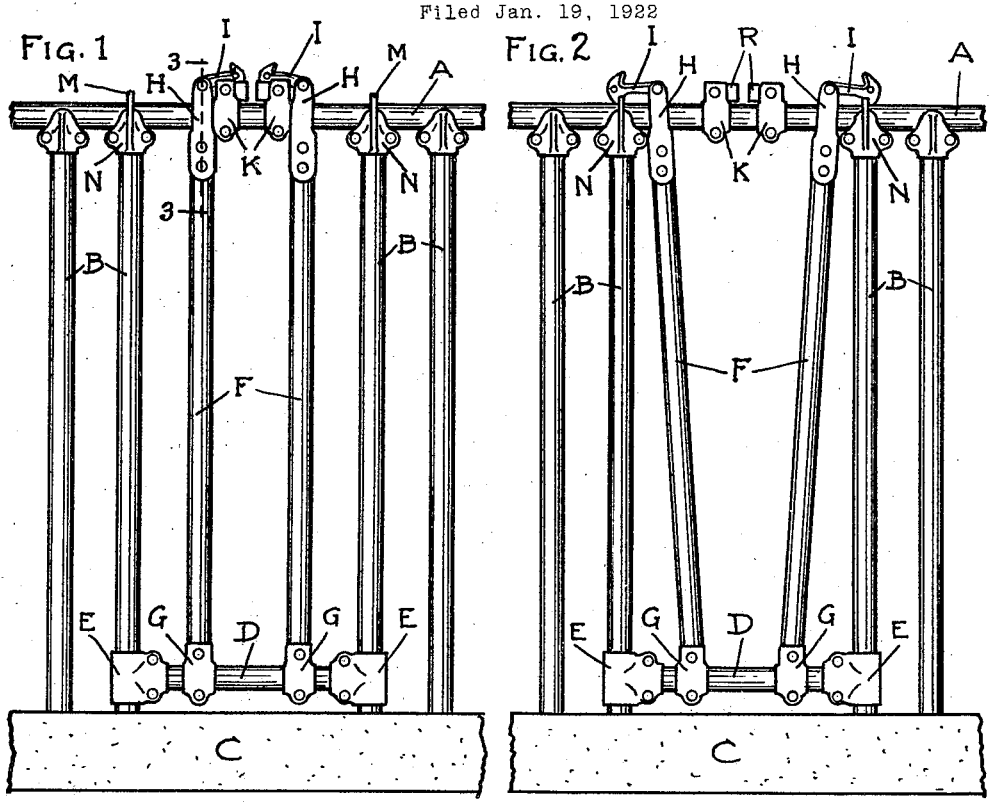
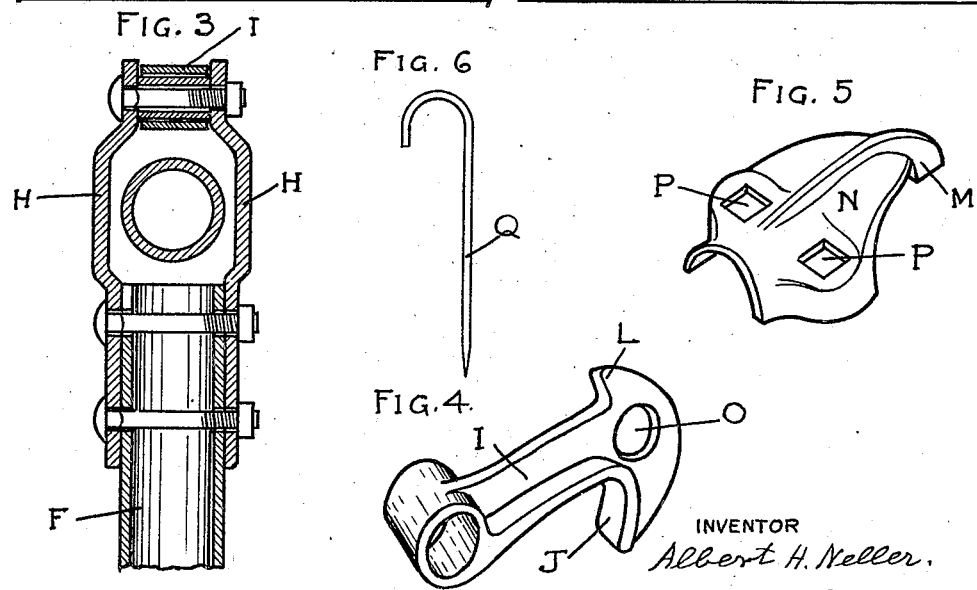

Patented Apr. 10, 1923.

1,451,402

UNITED STATES PATENT OFFICE.

ALBERT H. NELLER, OF FAIRFIELD, IOWA, ASSIGNOR TO THE LOUDEN MACHINERY COMPANY, OF FAIRFIELD, IOWA, A CORPORATION OF IOWA.

ANIMAL STANCHION.

Application filed January 19, 1922. Serial No. 530,362.

*To all whom it may concern:*

Be it known that I, ALBERT H. NELLER, a citizen of the United States, residing at Fairfield, in the county of Jefferson and State of Iowa, have invented a new and useful Improvement in Animal Stanchions, of which the following is a specification.

My invention relates to stanchions designed to be used principally in animal pens, such as is shown in my Patent No. 1,163,440, December 7, 1915, of which this invention is designed to be an improvement, and it consists of improved means whereby the stanchion bars will be locked open as well as shut, and of other features which will be described herein, and which may be set forth in the claims.

In the accompanying drawings forming a part of this specification, Fig. 1 is a side elevation of a section of a panel for an animal pen fitted with stanchion bars with a locking mechanism embodying the features of my invention. Fig. 2 is the same showing the stanchion bars in a different position. Fig. 3 is an enlarged transverse section on line 3—3 of Fig. 1. Figs. 4, 5 and 6 are detail views which will be hereafter described.

Referring to the drawings, A represents the top-rail of a section of a panel for an animal pen, B the uprights or fillers connected to the top-rail, and C the curb in which the uprights or fillers are usually set. D represents a lower horizontally disposed rail which is usually connected to adjacent uprights by coupling members E. The stanchion bars F are pivotally supported at their lower ends by pivot members G usually connected to the lower rail D, and are provided at their upper ends with members H which are adapted to straddle and slide upon the upper rail A.

Pivotally mounted on the upper ends of the members H are latches I as most plainly shown by Fig. 4, having hooks J adapted to hook over catches K secured to the top rail A and thus to hold the stanchion bars in closed position. To hold the stanchion bars locked in open position the latch members I are provided with hooks L having beveled outer edges placed opposite to the hooks J so that when the latches are turned over on their pivots, these hooks will slide over and catch on projections on the top rail outside of the stanchion bars as shown in Fig. 2.

These projections may be attached to the panel in any suitable manner but are preferably extensions M formed on the adjacent coupling members N which connect the upright or filler B to the top-rail A.

It will be noted that the stanchion bars F are operated independenly of each other and are not designed under any circumstances to be connected together. If desired, one of the stanchion bars may be omitted and in that event the animal may be held between the remaining stanchion bar and one of the fillers "B" which may be moved into the position occupied by the omitted stanchion bar, a structure well known in the art.

The latch I is designed to operate with a single stanchion bar only, and its operation will in nowise be affected by the removal of the other bar. It is important that the outer edge of the hook L be beveled so it will automatically slide over and catch on the projection M or its equivalent. A notch in the latch with a right angular outer edge would have to be lifted by hand over the projection and would not be as successful in operation.

The coupling member N is preferably made in two parts, one of which is shown in perspective by Fig. 5, and these parts are clamped on the top-rail by bolts passed through bolt holes P in the member N. The extensions M on the mating members are arranged to meet together and to form a catch over which the hook L on the latch I will easily pass when the stanchion bars are opened and will catch thereon, as shown in Fig. 2, whereby the bars will be securely held in open position, and an animal such as a bull, will be prevented from prematurely closing the bars by its horns or otherwise.

It is preferable that each of the latches be provided with an opening O in its free end between the hooks J and L, so that the person operating the stanchion by using a pointed rod or cane, such as Q in Fig. 6, the pointed end of which he can insert in the opening O, can lift the latch from its catch and turn it over so it may engage the catch on the opposite side. Frequently these stanchions are used on mangers inside of pens at a distance from the panel where the latches cannot be easily reached by hand. In such cases this arrangement will be exceedingly convenient. The rod may be provided with a hook at one end as shown whereby it may be hung upon the top rail where it will be ready for use whenever needed to open or close the latches.

Guards R may be placed on the catches K to prevent the premature lifting of the latches I and the opening of the stanchion bars by the animal's horns coming in contact with the free ends of the latches. It will be further noted that the latch I of itself, and without the aid of any additional mechanism except the catches K and M, will alternately hold the stanchion bar in open and in closed position. The device is extremely simple in its construction and is exceedingly efficient in operation. If desired a single pivoted stanchion bar may be used instead of a pair, as shown, and other similar changes in the construction may be made without departing from the spirit of my invention.

What I claim is:

1. In animal stanchions, a stanchion bar pivotally supported at its lower end, a horizontally disposed rail upon which the upper end of the stanchion bar is adapted to slide from one position to another, a catch applied to the horizontally disposed rail on each side of the upper end of the stanchion bar, a latch pivoted at one end to the upper end of the stanchion bar and adapted to be turned over from one side to the other, and oppositely disposed hooks on the free end of said latch having sloping outside edges adapted, as the latch is turned over, to automatically slide over and co-act with the opposite catches on the horizontally disposed rail, and without additional mechanism, to alternately lock the stanchion bar in open as well as in closed position.

2. In animal stanchions, a stanchion bar pivotally supported at its lower end, a horizontally disposed rail upon which the upper end of the stanchion bar is adapted to slide, a latch having oppositely placed hooks on one end and its other end pivoted to the upper end of the stanchion bar, so it may be turned over on its pivot from one side to the other, a coupling for an auxiliary member applied to the horizontally disposed rail, on one side of the stanchion bar, an extension on said coupling, a catch applied to the rail on the other side of the stanchion bar, one of the hooks on the latch being adapted to co-act with the catch to hold the stanchion bar in closed position and the other hook being adapted to co-act with the extension on the coupling to hold the stanchion bar in open position.

3. In animal stanchions, a stanchion bar pivotally supported at its lower end, a horizontally disposed rail upon which the upper end of the stanchion bar is adapted to slide, a latch having oppositely placed hooks on one end and its other end pivoted to the upper end of the stanchion bar, so it may be turned over on its pivot from one side to the other, oppositely located catches applied to said rail and adapted to alternately co-act with the hooks on the latch, and to alternately hold the stanchion bar in closed and in open position, an opening in the end of the latch having the hooks and means to insert in said opening from a distance to turn the catch over and to disconnect the hooks from the catches.

4. In animal stanchions, a pair of stanchion bars pivotally supported at their lower ends, a horizontally disposed rail upon which the upper ends of the stanchion bars are adapted to slide in opposite directions, a pair of latch members having oppositely placed hooks on one end, and the other end of each latch member being pivoted to the upper end of each stanchion bar, so the latches may be turned over on their pivots from one side to the other, a pair of couplings for auxiliary members applied to the horizontally disposed rail on opposite sides and outside of the stanchion bars, an extension on each of said couplings, a pair of catches applied to the rail between the stanchion bars, one of the hooks on each of the latches being adapted to co-act with the catches between the stanchion bars to hold them in closed position, and the other hooks being adapted to co-act with the extensions on the couplings outside of the stanchion bars to hold them in open position.

Fairfield, Iowa, January 16, 1922.

ALBERT H. NELLER.